(12) United States Patent
Zhang

(10) Patent No.: US 7,756,802 B2
(45) Date of Patent: Jul. 13, 2010

(54) COMBINER TRAINING AND EVALUATION WITH RANDOM DATA PARTITION

(75) Inventor: Qi Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 676 days.

(21) Appl. No.: 11/754,859

(22) Filed: May 29, 2007

(65) Prior Publication Data

US 2008/0300833 A1    Dec. 4, 2008

(51) Int. Cl.
G06F 17/00 (2006.01)
G06N 5/00 (2006.01)

(52) U.S. Cl. .......................... 706/45; 705/29; 704/240; 382/190

(58) Field of Classification Search ........................ None
See application file for complete search history.

(56) References Cited

U.S. PATENT DOCUMENTS

| | | | |
|---|---|---|---|
| 5,619,709 A | 4/1997 | Caid et al. | |
| 5,832,182 A | 11/1998 | Zhang et al. | |
| 5,838,816 A | 11/1998 | Holmberg | |
| 6,009,199 A | 12/1999 | Ho | |
| 6,278,799 B1 | 8/2001 | Hoffman | |
| 6,535,641 B1 | 3/2003 | Baggenstoss | |
| 7,054,810 B2 | 5/2006 | Gao et al. | |
| 2003/0204508 A1 | 10/2003 | Cantu-Paz et al. | |
| 2004/0230586 A1 | 11/2004 | Wolman | |
| 2005/0286772 A1* | 12/2005 | Albertelli | 382/224 |

OTHER PUBLICATIONS

Bryll, R. et al., "Attribute bagging: improving accuracy of classifer ensembles by using random feature subsets," *Pattern Recognition*, vol. 36, pp. 1291-1302 (2003).
Fred, A. et al., "Data Clustering Using Evidence Accumulation," http://www.cse.msu.edu/prip/Files/AFred_AJain_ICPR2002.pdf, 5 pages (Apr. 15, 2002).
Kittler, J. et al., "Combining Classiers," http://scholar.google.com/scholar?hl=en&lr=&q=cache:rc2aIiotrYoJ:ftp://ftp.ee.surrey.ac.uk/pub/research/VSSP/staff/j.kittler/bob/new.ps+, 21 pages (downloaded from the Internet on Apr. 20, 2007).

* cited by examiner

*Primary Examiner*—Donald Sparks
*Assistant Examiner*—Kalpana Bharadwaj
(74) *Attorney, Agent, or Firm*—Merchant & Gould

(57) ABSTRACT

Available training data is randomly data partitioned to generate a training data set for training base modules of a pattern recognition system and a distinct tune data set for training the combiner of the system. The process can be repeated with randomly generated data sets each time. After the combiner is trained, it can be evaluated employing another random partitioning of the training data to a training data set for training new set of base modules and a distinct test data set for evaluating the combiner providing reliable statistical evaluation of the combined system without the need of a standalone test set.

20 Claims, 6 Drawing Sheets

COMBINER TRAINING AND EVALUATION WITH RANDOM DATA PARTITION

BACKGROUND

Multiple base recognition modules that complement each other and a combiner are commonly used in pattern recognition for enhanced results. Combiners are usually trained from data to learn how to combine results from various base modules. The data used to train the combiner may be the same training data set used to train base modules, or a tune data set distinct from the training set. The tune set usually may provide better results as the features generated are closer to the generalization case. The effectiveness of a combiner is typically evaluated on a test data set distinct from both the training and the tune data sets.

This scheme of combiner training and evaluation provides better results when a large amount of training data is available, where base modules can be sufficiently trained, there is sufficient tune data to generate training patterns for the combiner, and there is sufficient test data to accurately evaluate the combiner precision.

However, in many practical pattern recognition problems (e.g. handwriting recognition), there may be a deficiency of training data. The aforementioned traditional method, which partitions data into a training set, a tune set, and a test set may not work well, as it may generate insufficiently trained base modules and combiners. The system is also evaluated with insufficient test patterns.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to employing random data partitioning to generate an infinite number of training patterns for a combiner in pattern recognition. Training data may be randomly partitioned to a training set for training based modules and a distinct tune set for generating training patterns for a combiner.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, overall performance of a pattern recognition system may be enhanced, especially when limited amount of training data is available, by randomly partitioning the data to generate an infinite number of training patterns for a combiner distinct from a training data set for the base modules. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
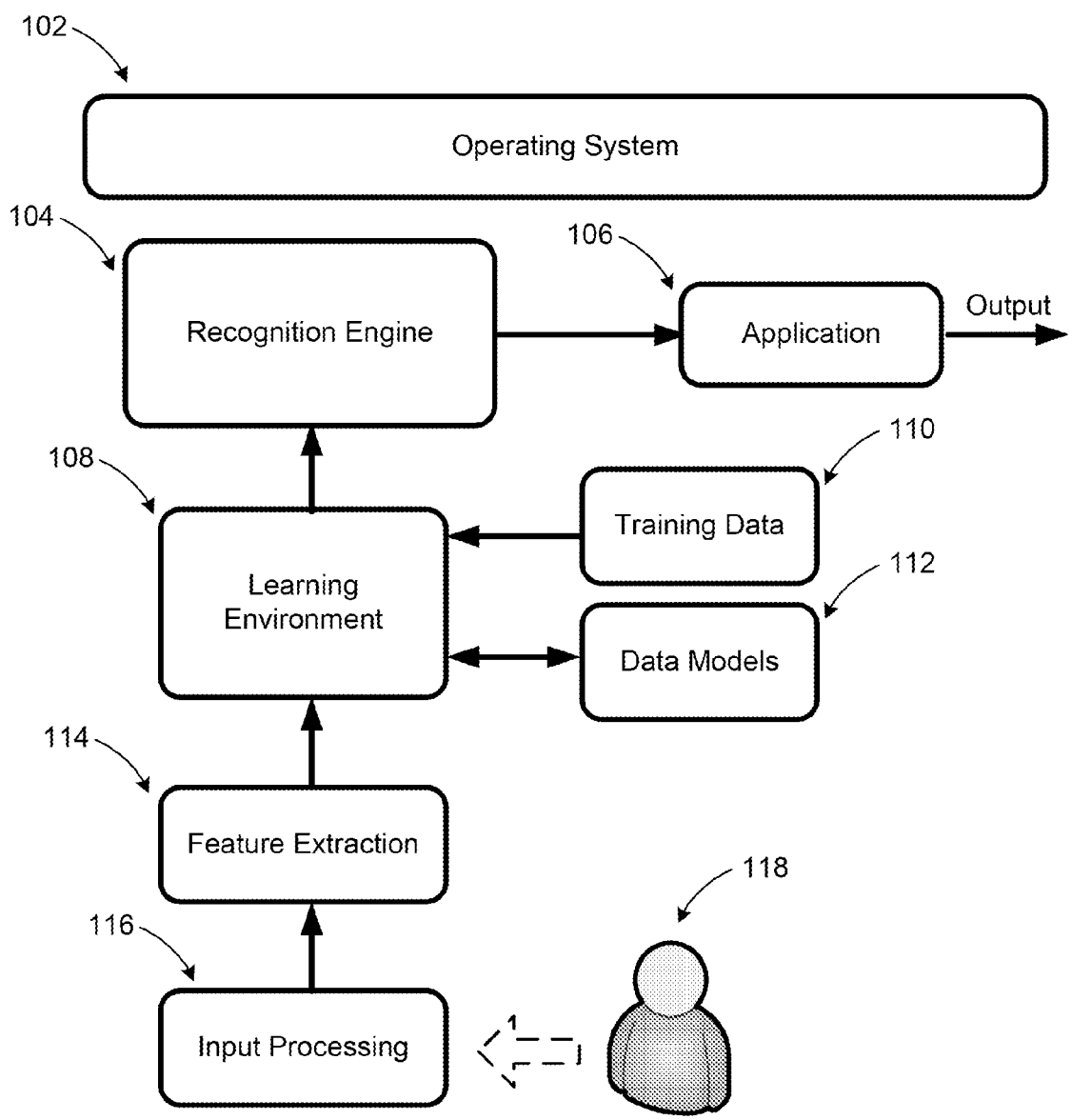
FIG. 1 illustrates an example architecture of a system employing pattern recognition for an application.

Referring to FIG. 1, an example architecture of a system employing pattern recognition for an application is illustrated. Pattern recognition aims to classify data (patterns) based on either a priori knowledge or on statistical information extracted from the patterns. The patterns to be classified are usually groups of measurements or observations, defining points in an appropriate multidimensional space.

A complete pattern recognition system an input processor that gathers the input data or observations to be classified or described, a feature extraction mechanism that computes numeric or symbolic information from the observations, and a classification or description scheme that does the actual job of classifying or describing observations, relying on the extracted features.

The classification or description scheme is usually based on the availability of a set of patterns that have already been classified or described. This set of patterns is termed the training set and the resulting learning strategy is characterized as supervised learning. Learning can also be unsupervised, in the sense that the system is not given an a priori labeling of patterns, instead it establishes the classes itself based on the statistical regularities of the patterns.

The classification or description scheme usually uses one of the following approaches: statistical (or decision theoretic), syntactic (or structural). Statistical pattern recognition is based on statistical characterizations of patterns, assuming that the patterns are generated by a probabilistic system. Structural pattern recognition is based on the structural interrelationships of features. A wide range of algorithms can be applied for pattern recognition, from very simple Bayesian classifiers to much more powerful neural networks.

Typical pattern recognition applications include automatic speech recognition, classification of text into several categories (e.g. spam/non-spam email messages), the automatic recognition of handwriting, or the automatic recognition of shapes (such as human faces).

As shown in FIG. 1, an operating system (102) with multiple pattern recognition enabled applications may provide an example implementation scenario for some embodiments. The operating system 102 may typically control a number of applications (e.g. application 106) including a word processing application, a spreadsheet application, a media player application, and the like. Each application may use a different aspect of pattern recognition such as handwriting recognition, speech recognition, shape recognition, and so on.

In a typical pattern recognition system, two separate processes occur: training and runtime recognition. In the training process, training data 110 is processed through input processing 116 then feature extraction 114. As a result, data models 112 are generated by learning environment 108.

In runtime recognition process, which shares processes 116 and 114 with the training process, operations begin with input processing (116) on input from a user 118 or from an information store (not shown). Depending on the pattern recognition type, the input may be speech, handwriting (ink), graphical input, and the like. For example, in a speech recognition system, an audio subsystem may convert sound input to audio signals which is then converted to textual data.

Feature extraction process 114 determines recognizable portions of the input data for processing in the learning environment 108. Learning environment 108 in conjunction with recognition engine 104 may include a number of base recognition modules and a combiner for performing the pattern recognition. Pattern recognition as performed by the recognition engine 104 in conjunction with the learning environment is the process, where input data is classified for software applications (e.g. application 106). Recognition engine 104 also loads in data models 112 (generated by training process mentioned above).

In an example speech recognition system, the recognition engine 104 may be a speech recognition engine comprising a number of components such as a language modeling module, a training module, a language model customization module, and the like. Speech recognition engine may recognize words, phrases, and the like, based on customized language and acoustic models and provides textual versions of the audio utterances. A grammar service may perform the task of managing recognized text before it is provided to applications such as a word processing application. Similar examples can be given for handwriting recognition systems, shape recognition systems, and the like.

Components of a pattern recognition system may be loaded into a server, executed over a distributed network, executed in a client device, and the like. Furthermore, the components described herein are for illustration purposes only, and do not constitute a limitation on the embodiments. A combiner training and evaluation system with random data partitioning may be implemented using fewer or additional components in various orders. Individual components may be separate applications, or part of a single application. Moreover, the pattern recognition system or its components may include individually or collectively a user interface such as a web service, a Graphical User Interface (GUI), and the like.

Figure 2:
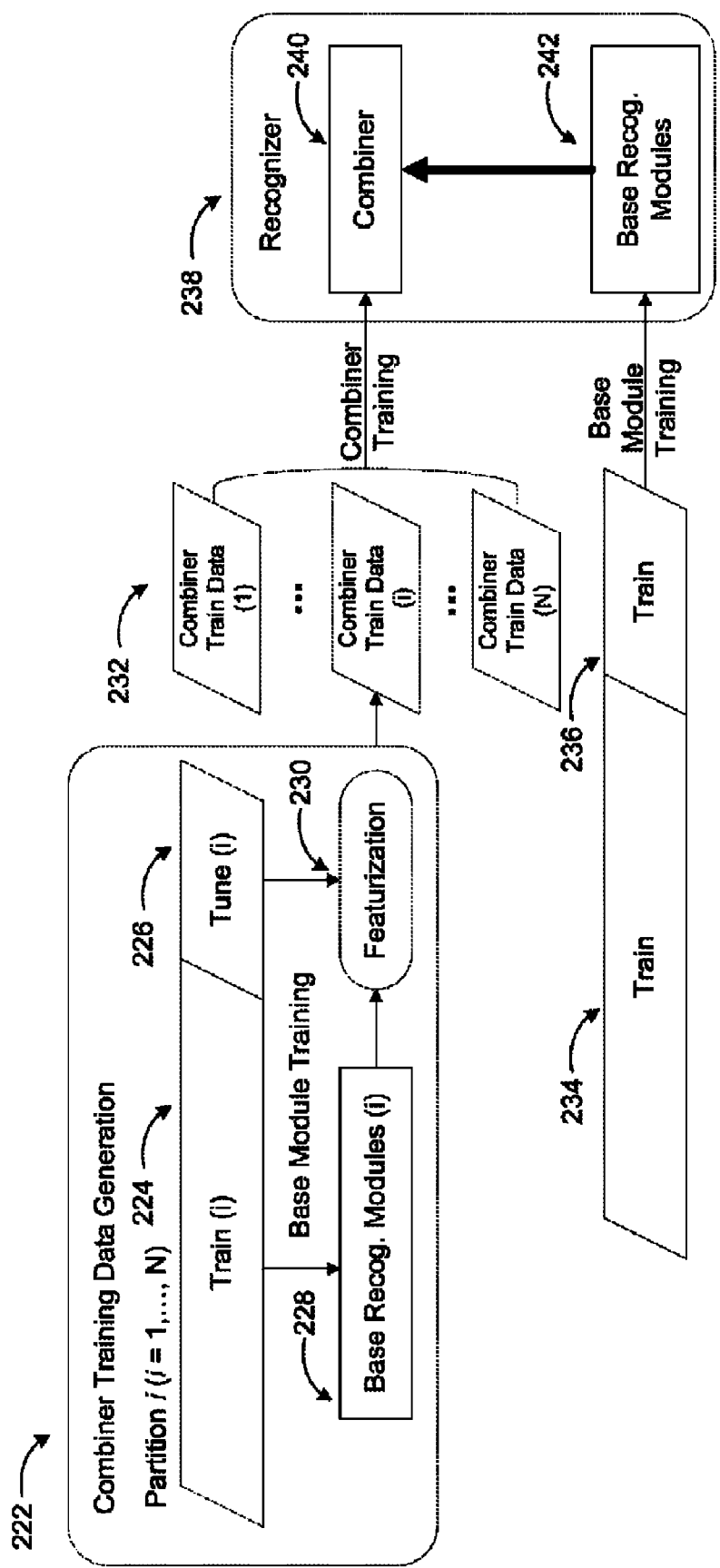
FIG. 2 illustrates an example process of combiner training data generation in a pattern recognition system according to one embodiment.

FIG. 2 illustrates an example process of combiner training data generation in a pattern recognition system. A system according to embodiments employs random data partitioning to effectively use available data multiple times for training the combiner in a pattern recognition system thereby overcoming insufficient training and evaluation patterns for the combiner when available data is limited. A similar partitioning scheme is also used to effectively evaluate the combiner without a need for a distinct test data set.

A method according to one embodiment may employ random data partitioning to generate any number (up to infinite) of training patterns for the combiner. The training data may be randomly partitioned to a training data set and a tune data set. Base modules may be trained using the training set. Then, the tune set (distinct from the training set) may be used to generate training patterns for the combiner based on the base modules already trained with training data set. This procedure may be repeated for every random partitioning of the training data—effectively generating infinite non-overlapping combiner training patterns even if there is limited training data for a pattern recognition system.

According to another embodiment, statistically meaningful test results may be generated for combiner evaluation without the need of a standalone test data set. After the combiner is trained as described above, different random partitioning may be used to divide training data to a training data set and a test data set. The training data set is again used to train the base modules (different from those trained during combiner training), and those base modules are then combined with the already trained combiner. Then, the system is evaluated using the new test data set. This procedure can be repeated multiple times, each providing a unique evaluation of the system. Together, the results provide a reliable statistical evaluation of the combined system without the need of a standalone test set.

According to a further embodiment, the base modules may be trained with all available training data once the combiner is already trained and evaluated providing enhanced base modules and improved overall generalization.

Referring back to FIG. 2, for each instance i, the training data is randomly partitioned to a training data set (i) 224 and a tune data set (i) 226. Training data set (i) 224 is used to train the corresponding instance of the base recognition modules (i) 228. Then, tune data set (i) 226 is run against base recognition modules (i) in the featurization process 230 to generate combiner training data (i) 232. This procedure may be repeated for i=1, 2, . . . , N, where N can be infinite (thus generating infinite number of training patterns for combiner).

Combiner training data (i) 232 are concatenated to provide sufficient training data for combiner 240 even if the full training data is small. The base recognition modules 242 in the final recognizer 238 are then trained with the full data set, which may also be randomly partitioned into training data sets 234 and 236 to enhance the base modules, thus providing a better overall result after combining.

Figure 3:
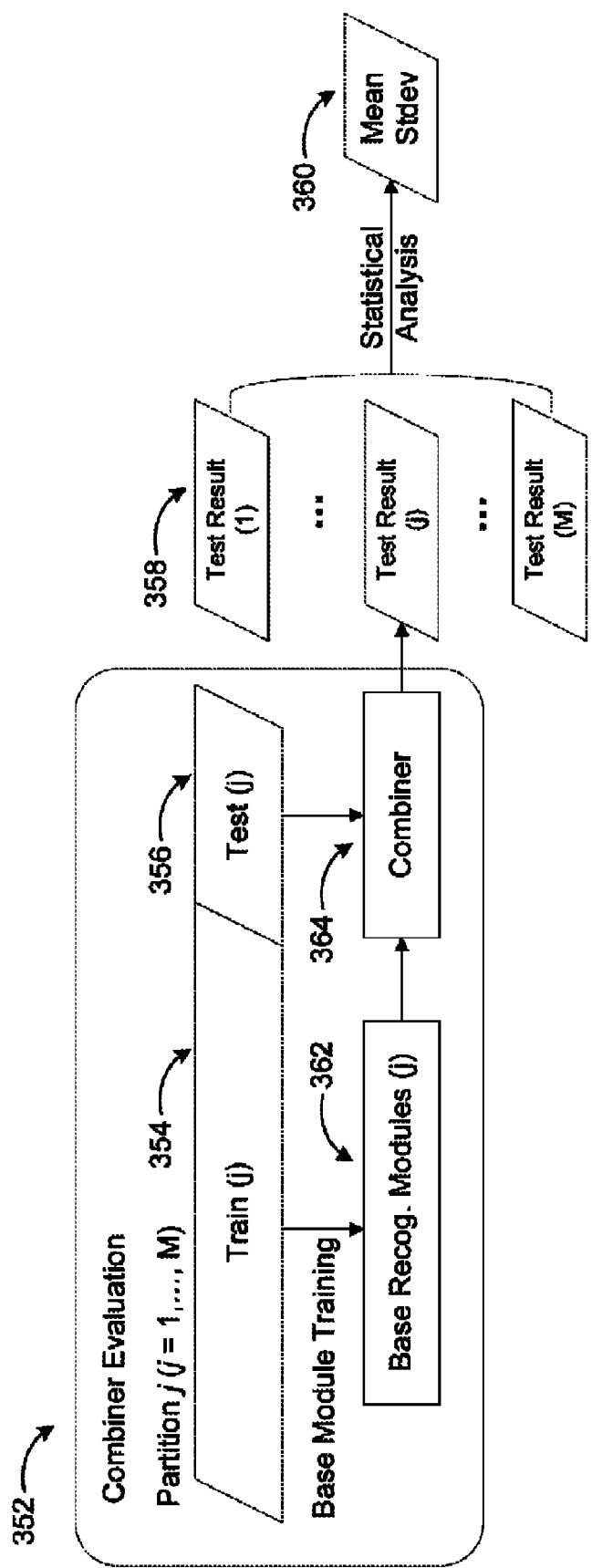
FIG. 3 illustrates an example process of combiner evaluation in a pattern recognition system according to another embodiment.

FIG. 3 illustrates an example process of combiner evaluation in a pattern recognition system. Statistically meaningful test results may be generated for combiner evaluation without the need of a standalone test data set after the combiner is trained as described above in conjunction with FIG. 2.

For each instance j of combiner evaluation 352, the training data may be randomly partitioned into training data set (j) 354 and test data set (j) 356. Training data set (j) 354 may be used to train base modules (j) 362. Combiner 364, trained as described above in conjunction with FIG. 2, is used to combine base modules (j) 362 together. Test data set (j) 356 runs through combiner 364 to generate test results (j) 358. This procedure is repeated for j=1, 2, . . . , M to get M sets of independent evaluation results. A statistical analysis such as mean or standard deviation (360) may be applied to get reliable evaluation of the combiner 364, without a separate test set, thus improving the efficiency of data utilization.

While individual steps of the combiner training and evaluation operations may be performed by individual modules, the processing may also be performed by a single or multiple software or hardware modules, or a combination of two. The embodiments are not limited to a single software module or hardware module implementation. Any combination of software and hardware may be used for implementing combiner training and evaluation by random partitioning.

Figure 4:
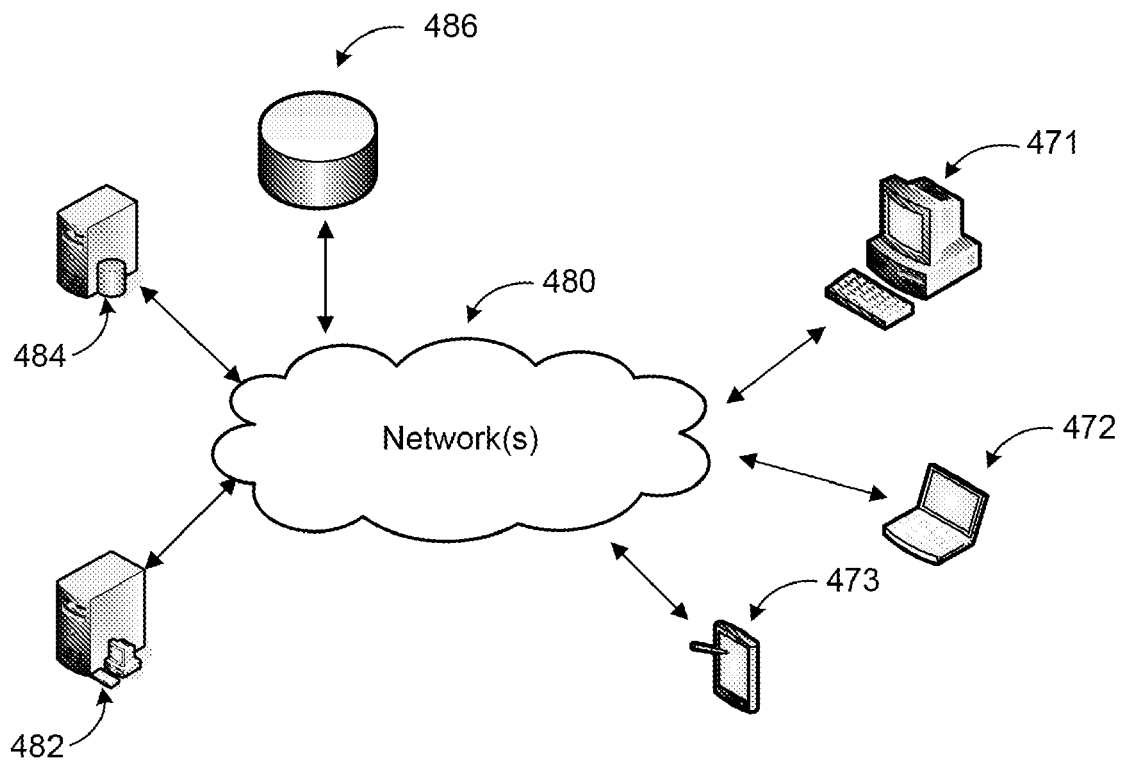
FIG. 4 is an example networked environment, where embodiments may be implemented.

FIG. 4 is an example networked environment, where embodiments may be implemented. Combiner training and evaluation with random data partitioning may be implemented locally on a single computing device. Input data to be processed may be received from one or more computing devices configured in a distributed manner over a number of physical and virtual clients and servers. They may also be implemented in un-clustered systems or clustered systems employing a number of nodes communicating over one or more networks (e.g. network(s) 480).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing combiner training and evaluation with random data partitioning may involve many more components, relevant ones are discussed in conjunction with this figure.

A pattern recognition engine according to embodiments may be implemented as part of any application that utilizes pattern recognition such as speech recognition, handwriting recognition, document classification, shape recognition, and the like, in individual client devices 471-473. Parts or all of the pattern recognition system may also be implemented in server 482 and accessed from anyone of the client devices (or applications). Data stores associated with input data, training data, and the like, may be embodied in a single data store such as data store 486 or distributed over a number of data stores associated with individual client devices, servers, and the like. Dedicated database servers (e.g. database server 484) may be used to coordinate input and/or training data retrieval and storage in one or more of such data stores.

Network(s) 480 may include a secure network such as an enterprise network, an unsecure network such as a wireless open network, or the Internet. Network(s) 480 provide communication between the nodes described herein. By way of example, and not limitation, network(s) 480 may include wired media such as a wired network or direct-wired connection, and wireless media such as acoustic, RF, infrared and other wireless media.

Many other configurations of computing devices, applications, data sources, data distribution systems may be employed to implement providing combiner training and evaluation with random data partitioning. Furthermore, the networked environments discussed in FIG. 4 are for illustration purposes only. Embodiments are not limited to the example applications, modules, or processes.

Figure 5:
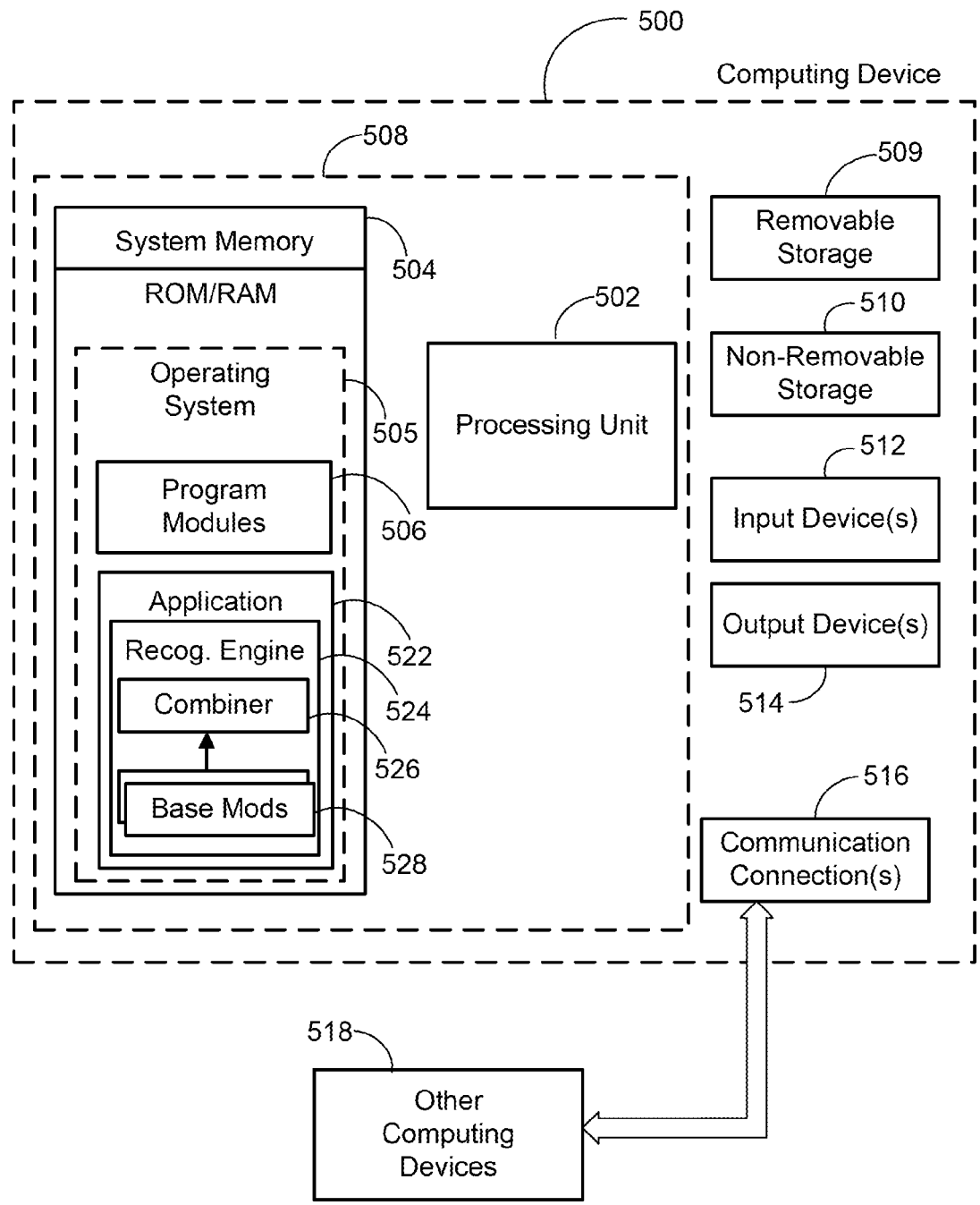
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a server or a client machine. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, application 522, recognition engine 524, combiner 526, and base modules 528.

Application 522 may be any application utilizing pattern recognition as discussed previously. The pattern recognition process may also be executed as a separate application or as an integral module of a service that provides other services to applications associated with computing device 500. Recognition engine 524 performs pattern recognition employing base modules 528 and combiner 526. According to some embodiments, random data partitioning may be employed by the recognition engine 524 to generate distinct training, tune, and test data sets from available training data for the combiner and the base modules such that reliable pattern recognition can be performed even when limited amount of training data is available. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509, and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that provide updates associated with the anti spyware service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
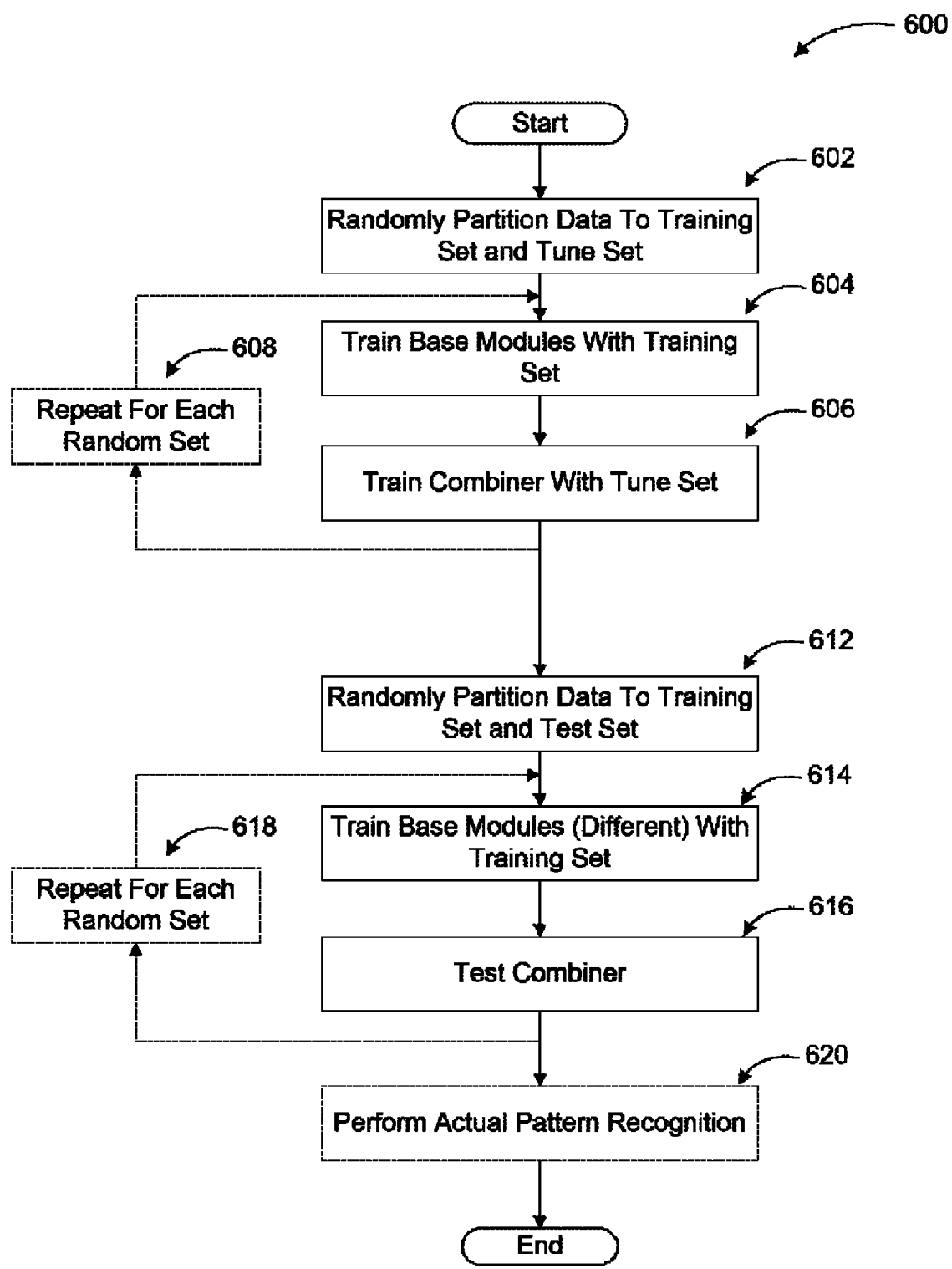
FIG. 6 illustrates a logic flow diagram of a combiner training and evaluation process with random data partition according to embodiments.

FIG. 6 illustrates a logic flow diagram of a combiner training and evaluation process with random data partition according to embodiments. Process 600 may be implemented as part of a recognition engine in a pattern recognition application.

Process 600 begins with operation 602, where the training data is randomly partitioned into a distinct pair of training data set and tune data set. Processing advances from operation 602 to operation 604. At operation 604, base modules are trained using the training data set. Processing continues to operation 606 from operation 604. At operation 606, the combiner is trained using training patterns generated from the tune data set that is distinct from the training data set. This procedure may be repeated for every random partitioning of the training data—effectively generating infinite non-overlapping combiner training patterns as indicated by optional operation 608 forming a loop between operations 606 and 604. Processing continues to operation 612 from operation 608.

At operation 612, the available training data is again randomly partitioned into a distinct pair of training data set and test data set. Processing continues to operation 614 from operation 612, where the training data set is again used to train the base modules (different from those trained during combiner training). Processing continues to operation 616 from operation 614.

At operation 616, the trained base modules are combined by the combiner using the test data set for testing the combiner. This procedure may also be repeated for every random partitioning of the training data—each repetition providing a unique evaluation of the system as indicated by optional operation 618 forming a loop between operations 616 and 614. After operation 616, processing moves to a calling process for further actions.

The operations included in process 600 are for illustration purposes. Providing combiner training and evaluation with random data partitioning may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for training and evaluating a combiner in a pattern recognition system, the method comprising:
randomly partitioning available training data into a first training data set and a tune data set that are distinct from each other;
training a first group of base modules associated with the pattern recognition system using the first training data set;
training the combiner using the tune data set and the trained first group of base modules;
training a second group of base modules using a second training data set; and
evaluating the combiner using the second group of base modules and a test data set randomly partitioned from the available training data.

2. The method of claim 1, further comprising:
randomly partitioning the available training data into the second training data set and the test data set that are distinct from each other after training the combiner.

3. The method of claim 1, further comprising:
repeating the training of the first group of base modules using the first training data set and the combiner using the tune data set by a predefined factor such that the first training data set and the tune data set are non-overlapping.

4. The method of claim 1, further comprising:
repeating the training of the second group of base modules using the second training data set and evaluating the combiner using the test data set by another predefined factor such that the second training data set and the test data set are non-overlapping.

5. The method of claim 1, wherein evaluating the combiner includes performing a statistical test on the combiner based on recognition results and the test data set.

6. The method of claim 1, wherein the first and the second group of base modules include at least two base modules.

7. The method of claim 1, wherein evaluating the combiner includes generating test patterns through a featurization process from the test data set.

8. The method of claim 1, wherein the pattern recognition system is for performing at least one from a set of: speech recognition, handwriting recognition, document categorization, and shape recognition.

9. The method of claim 1, wherein second group of base modules are trained using the first training data set.

10. A system for training and evaluating a combiner in a pattern recognition system, the system comprising:
a memory;
a processor coupled to the memory, wherein the processor is configured to execute program modules including:
a pattern recognition application that includes:
a recognition module configured to:

randomly partition available training data into a first training data set, a tune data set, and a test data set that are distinct from each other;

train a first group of base modules associated with the pattern recognition system using the first training data set;

train the combiner using the tune data set and the trained first group of base modules;

train a second group of base modules distinct from the first group using the first training data set; and statistically evaluate the combiner using the trained second group of base modules and the test data set.

11. The system of claim 10, wherein the available training data is randomly partitioned for each instance of the base modules and the combiner.

12. Tie system of claim 10, wherein the recognition module is further configured to generate training patterns from the first training data set and the tune data set.

13. The system of claim 12, wherein the training patterns are generated from the tune data set by featurization.

14. The system of claim 10, wherein the second group of base modules are trained using a second training data set randomly partitioned from the available training data.

15. The system of claim 10, further comprising a data store for storing the available training data.

16. The system of claim 10, wherein recognition module is further configured to evaluate the combiner by computing one of a mean and a standard deviation of recognition results in comparison to the available training data.

17. A computer-readable storage medium with instructions encoded thereon for training and evaluating a combiner in a pattern recognition system, the instructions comprising:

randomly partitioning available training data into a first training data set, a second training data set, a tune data set, and a test data set that are distinct from each other;

training a first group of base modules associated with the pattern recognition system using the first training data set;

training the combiner using the tune data set and the trained first group of base modules;

training a second group of base modules distinct from the first group using the second training data set distinct from the first training data set;

statistically evaluate the combiner using the trained second group of base modules and the test data set; and perform pattern recognition using the base modules and the combiner on actual pattern data.

18. The computer-readable storage medium of claim 17, wherein the instructions further comprise:

repeating the random partitioning and the combiner training N times for each instance of the base modules and the combiner, where N is a predefined integer.

19. The computer-readable storage medium of claim 17, wherein the instructions further comprise:

repeating the random partitioning and the combiner testing M times for each instance of the base modules and the combiner, where M is a predefined integer.

20. The computer-readable storage medium of claim 17, wherein recognition results during the combiner testing are compared statistically to the test data set.

* * * * *